April 21, 1931.                M. K. DOUGLAS                1,802,241
                              MOLDING APPARATUS
                      Filed March 30, 1929      4 Sheets-Sheet 4
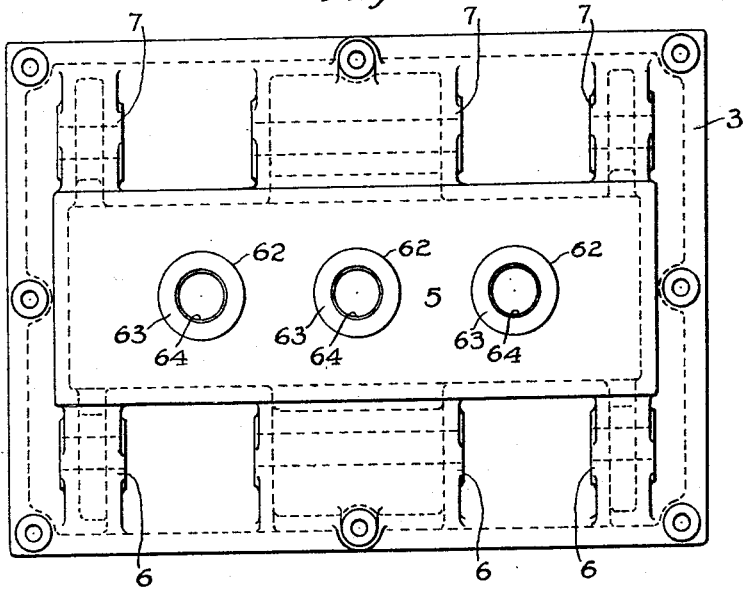
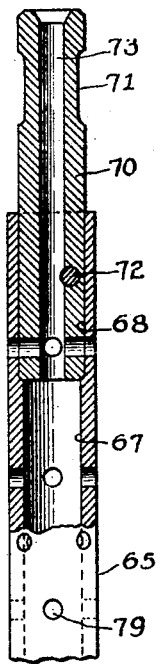
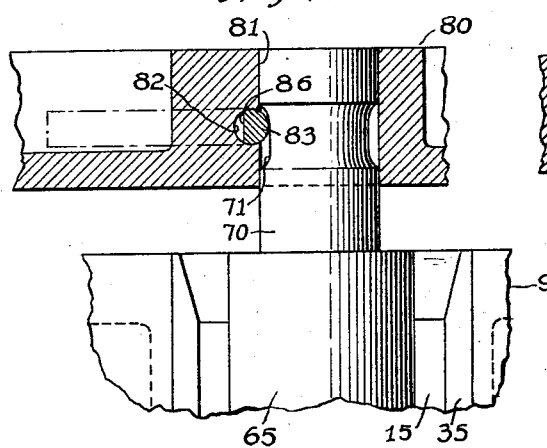
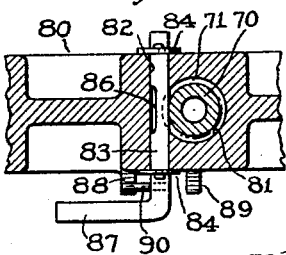
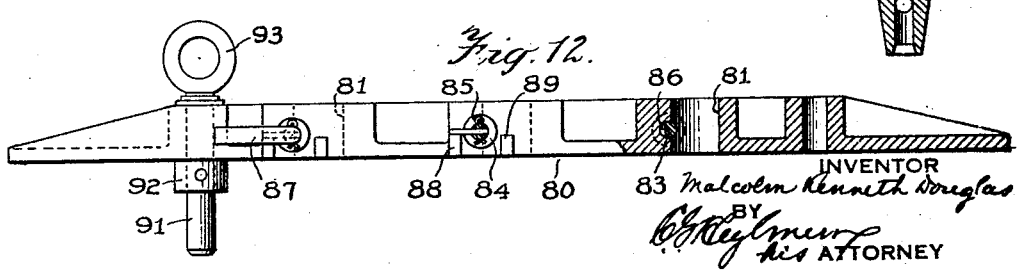

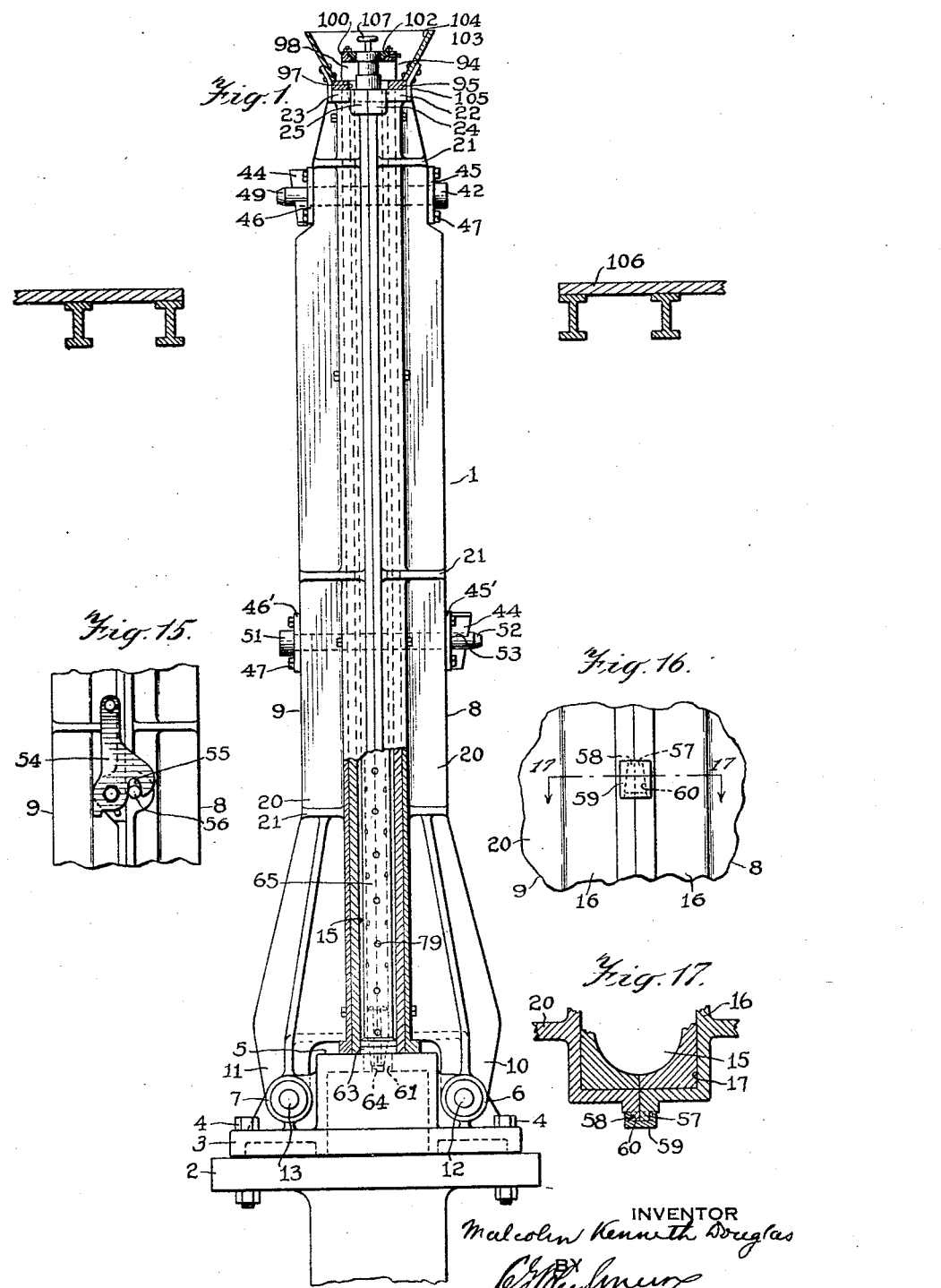

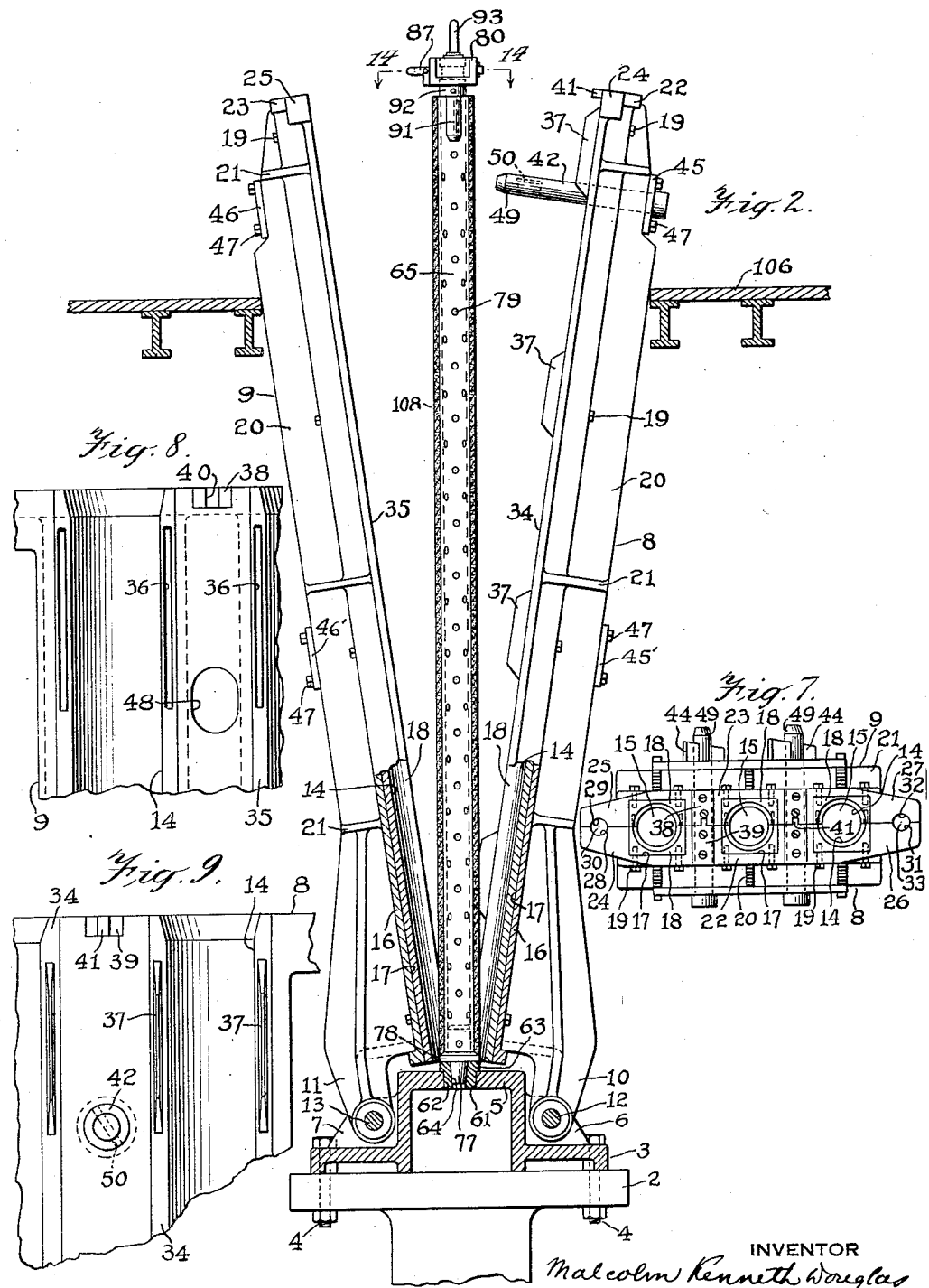

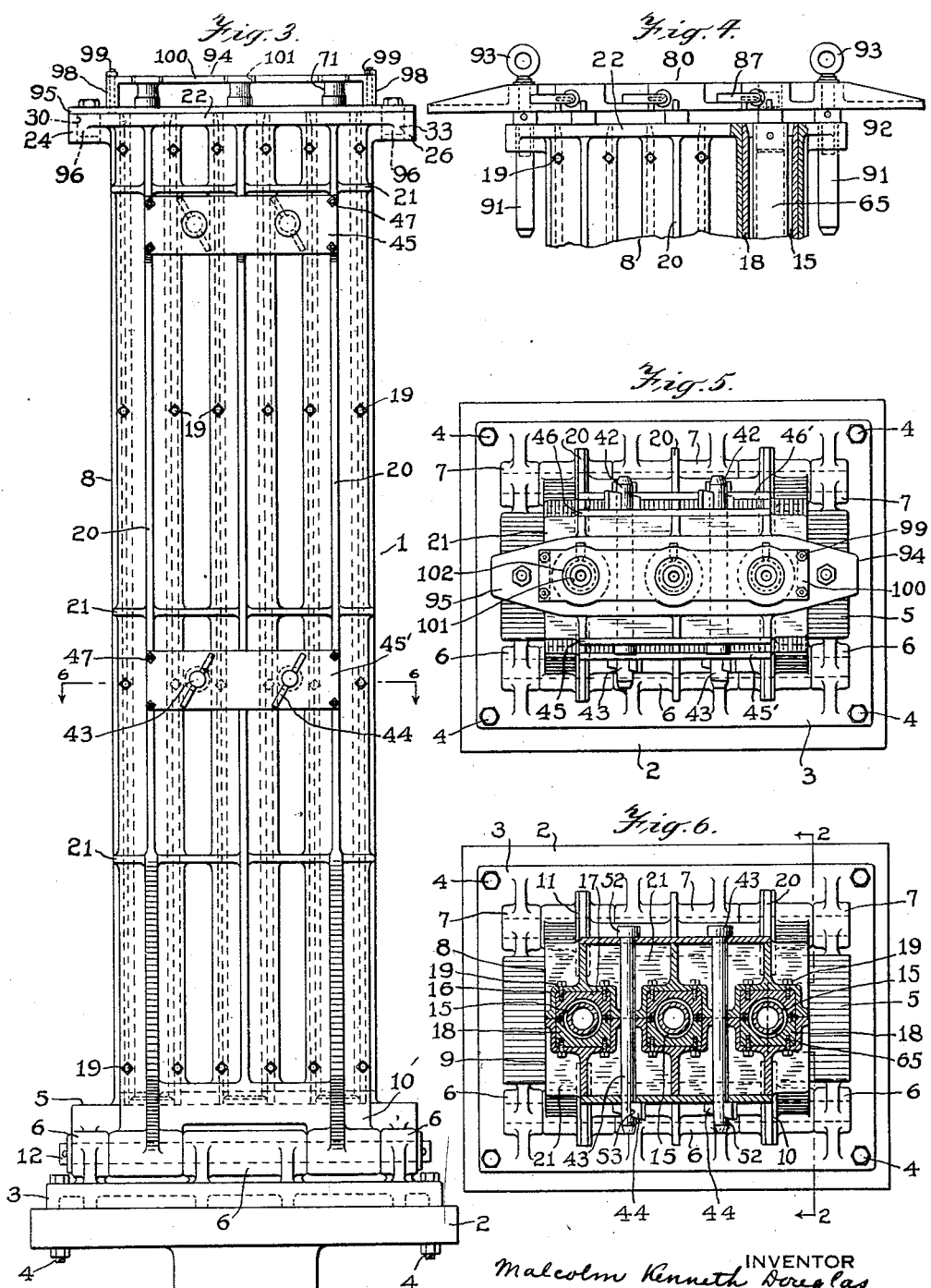

Patented Apr. 21, 1931

1,802,241

UNITED STATES PATENT OFFICE

MALCOLM KENNETH DOUGLAS, OF NEW YORK, N. Y., ASSIGNOR TO AMERICAN RADIATOR COMPANY, OF NEW YORK, N. Y., A CORPORATION OF NEW JERSEY

MOLDING APPARATUS

Application filed March 30, 1929. Serial No. 351,249.

My invention relates to new and useful improvements in molding apparatus, and more particularly to apparatus for forming cores of finely divided material for use in casting.

An object of my invention is to provide an apparatus in which cores for use in casting tubular members may be readily and efficiently made.

Another object of my invention is to provide an apparatus from which the formed cores may be removed with a minimum danger of breakage.

Another object is to provide an apparatus in which the core-supporting arbor members will be accurately positioned in the core-forming chamber.

The invention consists in the improved construction and combination of parts, to be more fully described hereinafter, and the novelty of which will be particularly pointed out and distinctly claimed.

In the accompanying drawings, to be taken as a part of this specification, I have fully and clearly illustrated a preferred embodiment of my invention, in which drawings—

Figure 1 is a view in side elevation, of my molding apparatus, with certain parts shown in vertical section;

Fig. 2 is a view in side elevation thereof in open position and partly in section on the line 2—2 of Fig. 6;

Fig. 3 is a view in front elevation of my device in closed, material-receiving position;

Fig. 4 is a detail front elevation showing certain arbor member carrying means in position;

Fig. 5 is a top plan view of Fig. 3;

Fig. 6 is a view in horizontal section on the line 6—6 of Fig. 3;

Fig. 7 is a top plan view with the arbor members removed;

Figs. 8 and 9 are detail views in elevation showing certain cooperating positioning and locking means;

Fig. 10 is a top plan view of a base member;

Fig. 11 is a view, partly in elevation and partly in vertical central section, of a core-supporting arbor member;

Fig. 12 is a view, partly in front elevation and partly in vertical central section, of an arbor member carrying means;

Fig. 13 is a detail section showing an arbor member and carrying means in cooperable relation;

Fig. 14 is a detail horizontal section on the line 14—14 of Fig. 2;

Fig. 15 is a detail of a modified form of locking means;

Fig. 16 is a detail of another modified form of locking means, and

Fig. 17 is a detail section on the line 17—17 of Fig. 16.

Referring to the drawings by characters of reference, 1 designates generally a molding apparatus for making cores of finely divided material such as core sand, or the like, for use in forming tubular members—for example, pipe, by casting, or a similar operation. The apparatus is preferably mounted on the platform 2 of a jolt ramming machine (not shown), which may be of any desired type which will serve to ram the finely divided core-forming material. The apparatus 1 includes a base or bottom member 3 which is bolted, as at 4, or otherwise rigidly secured to platform 2. The member 3 has a centrally positioned raised platform portion 5, and at the front and rear of which are sets of axially alined spaced bearing supports 6, 7, respectively. Mounted on the member 3 is a core box comprising vertical or upward extending members or sections 8, 9 which rest at their bottom ends on the platform portion 5. The members 8, 9 have depending leg members 10, 11, respectively, the lower ends of which aline with the supports 6, 7, respectively, and through the members 10 and supports 6 and through the members 11 and supports 7 are bearing shafts 12, 13, respectively. The shafts 12, 13 are laterally offset from the center line of the platform portion 5, so that the members 8, 9 will move upward and outward as the members are moved from the position of Fig. 1 to the position of Fig. 2. The members or sections 8, 9 are preferably substantially similar, each having an inner face 14 contoured or formed to provide a portion or strip of the longitudinal wall of a core-forming chamber 15. The longitudinal side edges of the section 8 abut the opposed side edges of the section 9 to form a tight joint when the sections are seated on the platform 5, so that the contoured faces 14 together form the complete longitudinal wall of the core-forming chamber. As shown, each of the sections 8, 9 has three contoured faces 14 to thereby form three chambers 15, but it is of course understood that this is merely illustrative, and that I do not limit myself to any given number of chambers. The sections or members 8, 9 preferably each comprise a supporting member 16 which is channeled or recessed longitudinally, as at 17, see Figs. 6 and 7, to receive a core chamber forming or filler member 18 in which is formed the part cylindrical face 14. The members 18 are rigidly held in the channels 17 by studs or screws 19. The members 8, 9 are preferably provided with longitudinal reinforcing ribs 20 which are joined by transverse ribs 21 and have at their top ends, plate or head members 22, 23, respectively, which project from one side of the members 8, 9, as at 24, 25, respectively, and from the other side, as at 26, 27, respectively. In the projecting portions 24, 25 are semi-cylindrical opposed substantially vertical recesses 28, 29 respectively, which together form a guide aperture 30. In the projecting portions 26, 27 are similar recesses 31, 32, respectively, which form a guide aperture 33. The opposed joining faces or edges 34, 35 of the members 18 carried by the sections 8, 9, respectively are provided with alining or centering means, preferably in the form of keyways 36 in the faces 35, and cooperating keys 37 rigidly secured to faces 34. Additional centering means for accurately positioning the core chamber forming sections may be employed, preferably in the form of plate members 38, 39 set rigidly in opposed relation in top recesses in the head members 22, 23. The members 38 have end slots 40 which receive fingers or lugs 41 projecting from members 39 (see Fig. 7). The sections or members 8, 9 are preferably tightly locked or clamped together at several points of their lengths by means of bars 42, 43 and wedges 44. On the outside of the members 8, 9 are plate members 45, 46, respectively, which are secured by studs, or the like 47 to the ribs 20. The bars 42 are rigidly secured to the upper member 46 and project between chambers 15 toward the section 8. In the section 8 and upper plate 45 between chambers 15, are elongated apertures 48 which aline with bars 42 which when the members or sections 8, 9 are in closed chamber-forming relation, will project through and beyond the plate member 45, as at 49. Through the projecting ends 49 are wedge slots 50 to receive the wedges 44 which when driven into slots 50 bear against plate member 46 and pull the sections 8, 9 tightly together. A second set of plate members 45', 46' is preferably secured to ribs 20 substantially midway of the length of sections 8, 9 to prevent them from springing apart during formation of the cores. Through these lower plate members 45', 46' and the sections 8, 9, are alined apertures to receive the bars 43 which have heads 51 to engage plate 46', and have at their ends 52, which project through and beyond plate 45', wedge slots 53 to receive wedges 44. The bars 43 are preferably removable so that when the sections are in open position, Fig. 2, there will not be danger of their being struck by the formed cores as the cores are withdrawn. In Fig. 15 is shown a modified form of locking means which may take the place of the bars and wedges, and which comprises a latch member 54 pivoted on the section 9 and having a cam groove 55 which cooperates with a pin or post 56 on the section 8 to draw the sections 8, 9 tightly into engagement. Another modified form of locking means is shown in Figs. 16 and 17, which comprises wedge portions 57, 58 rigid respectively with sections 8, 9, and which together form a wedge member having downward diverging side faces when the sections 8, 9 are in closed position. A block member 59 having a channel 60 with downward diverging inside faces fits over the wedge member to cooperate with the faces thereof so that downward movement of member 59 draws the portions 57, 58 and therefore the sections 8, 9 tightly together. Concentric with the chambers 15 are apertures 61 through the platform portion 5 and in which are positioned stool members 62, each having a surrounding top flange 63 which is of a diameter substantially equal to the diameter of its chamber 15, so that the flange 63 extends into the chamber and serves to close or plug the lower end thereof. Through the stool members 62 are centering holes 64, for a purpose to be described, which converge downward for the major portion of their lengths and which are concentric with the longitudinal axes of chambers 15.

Within each of the chambers 15 is a core-supporting arbor member 65, which comprises a tubular member 66 of a length substantially equal to the length of chambers 15 (see Figs. 2 and 11), having a longitudinal bore 67 which is enlarged at its top and bottom ends, as at 68, 69, respectively. Secured in the enlarged bore 68 is a plug member 70 which projects above its chamber 15 and has above members 66 a circumferential recess 71, for a purpose to be described. A pin 72 is passed through the member 66 and member 70 to hold them together. Longitudinally through the plug member 70 is a vent hole 73 which opens into the bore 67. At its lower end the member 66 is recessed to provide a downward facing annular shoulder 74 about the enlarged bore 69. Secured in the enlarged bore 69 is a plug member 75 having a lateral flange 76 which seats against shoulder 74. The end 77 of member 75 which projects below member 66 converges or tapers downward such that it will fit in the tapered centering holes 64 and accurately position the lower end of member 65 in the chamber 15. The bottom end of member 66 has a circumferential flange 78 of a diameter equal to the diameter of its chamber 15 and which seats upon the stool member flange 63. The flange 78 serves as a support for the core-forming material. At spaced intervals through the wall of member 66 are vent holes 79.

The members 65 are supported for positioning in and removal from chamber 15 by a carrier member 80 (see Figs. 2, 4, 12, 13 and 14) which comprises a bar member having parallel apertures 81 therethrough which are substantially cylindrical and of a diameter substantially equal to the diameter of the plug members 70, and which are so spaced apart that they will aline concentrically with the chambers 15. Through the member 80 transverse to apertures 81, are bearing bores 82 which intersect respectively for a portion of their diameters the apertures 81. Extending through the bores 82 are locking members 83, preferably rod members journaled in bores 82, and secured against longitudinal displacement by washers 84 and cotter-pins 85, or the like. The rod members 83 are recessed, as at 86, within bores 82, so that in one position of their rotation the rod members will not obstruct the apertures 81 whereby the arbor members 65 may be freely inserted and removed therefrom, while in another position of rotation of rod members 83—say, through 180°—the rod members will obstruct the apertures 81 and seat in the respective circumferential recesses 71 of members 65, as is apparent from Fig. 13, to prevent removal of members 65 from member 80. At one end of locking members 83 are hand-grip members 87, by which the members 83 may be readily turned by an operator. Projecting from member 80 are spaced stop lugs 88, 89 for each of the members 83. Carried by each of members 83 is an arm or pin 90 which cooperates with lugs 88, 89 to limit rotation of members 83 such that when pins 90 are in engagement with lugs 89, apertures 81 will be unobstructed by members 83, and when pins 90 are in engagement with lugs 89, apertures 81 will be obstructed and members 83 will be seated in recesses 71. Depending from member 80 are guide members 91, preferably pins, which, when the upper ends of arbor members 65 are centered in chambers 15, will be alined with guide apertures 30, 33, respectively, so that the members 91 and apertures 30, 33 cooperate to center the upper ends of the members 65 in their respective chambers 15. In order to space the carrier member 80 from the top of the core box, spacer means 92, preferably ring members secured on pins 91, are employed, which seat on the top face of members 8 and 9. The member 80 may be provided with hoist attaching means 93, such as eye members, by which the carrier member and its supported arbor members may be transferred to and from the core box.

The arbor members 65 are maintained centered at their upper ends while the finely divided material is being fed into the chambers 15 by means of a centering device 94, (see Figs. 1, 3 and 5). The device 94 comprises a plate member 95 which has the general plan outline of the head members 22, 23, and which is supported thereon. Depending from member 95 are centering members 96, preferably pins, which cooperate with the guide apertures 30, 33. Through the member 95 are apertures 97 which are of a diameter substantially equal to the diameter of chambers 15, and which aline concentrically therewith when the pins 96 are in the apertures 30, 33. Adjacent the ends of plate member 95 are supporting posts 98 which are rigidly secured to member 95 by bolts, or the like, 99. Extending between posts 98 is a plate member 100 which is in a plane substantially parallel to member 95, and when the members 65 are positioned in chambers 15, will lie in the horizontal plane of the top ends of plug members 70. Through upper plate member 100 are apertures 101 into which the top ends of members 70 extend, and which are of substantially the same diameter as the top ends of members 70, so that the upper ends of members 65 will be accurately centered in the chambers 15. If desired, the plate member 100 may be provided with bushings 102 having the apertures 101, so that wear on the plate member 100 which would prevent accurate centering may be remedied by the use of new bushings 102.

A core-forming material guide means 103 may be employed to direct the material into apertures 97, and preferably comprises a funnel of substantially rectangular plan outline having downward converging side walls 104 and being open at top and bottom. The walls 104 rest upon the plate member 95, and the funnel is positioned laterally by fingers or lugs 105 which depend from the outer face of wall 104 and slidably engage the side faces of the head members 22, 23, so that the means 103 may be readily placed in and removed from operative position on the core box.

The operation of my apparatus is as follows: The core box 1 is opened, as shown in Fig. 2, the sections 8, 9 resting against the side edges of an opening through a platform or floor 106 on which an operator stands in carrying out the core forming operation. The chamber forming faces 14 and base platform 5 are cleaned by the operator preferably with air under pressure and kerosene. A carrier member 80 is hung or supported from an overhead hoist (not shown) by means of the rings or eyelets 93, and arbor members 65 are inserted in the apertures 81 and locked therein by rotation of members 83. The arbor members 65 are then preferably coated with a paste of Kordax and water which aids with the adhering of the core forming material to the members 65. The carrier member 80 and its depending arbor members 65 are transferred to the open core box 1 and they are lowered into the chambers 15 so that the tapered arbor ends 77 are simultaneously positioned in the centering or locating base member sockets 64. The core box 1 is then closed by swinging the sections 8, 9 on their respective pivots 12, 13, which brings the joining edges 34, 35 of the filler members 18 into contact. As the sections 8, 9 come or close together, the positioning means 36, 37 and 40, 41 will cooperate to accurately aline the joining edges and hold the same tightly against lateral slippage. Wedges 44 are driven into the slots 50, and the pins or bars 43 are inserted in the box 1, and wedges 44 are driven into slots 53 to tightly clamp the sections 8, 9 in chamber forming relation. Clamping together of sections 8, 9 requires that the guide pins 91 be located in guide apertures 30, 33 so that the top ends of members 65 are thereby accurately positioned in the top ends of chambers 15. The carrier member 80 is now unlocked by a reverse rotation of locking members 83, and the carrier member 80 is lifted by the hoist from the arbor members 65. The centering device 94 is placed on the box 1 with pins 96 projecting into apertures 30, 33 and with the top ends of the plug members 70 positioned in the centering apertures 101 so that the arbor members 65 are rigidly held against lateral displacement at both top and bottom for accurate formation of the cores. The vent bore 73 is closed by plug members 107, Fig. 1, and the core forming material guide means 103 is mounted on the box 1, the same resting on the plate 95 of the core spider or device 94 and being positioned laterally by the fingers or lugs 105 engaging the side faces of the box head. A quantity of core forming material, such as core sand, is now fed into the chambers 15 around arbor members 65. The jolt machine is now started which vibrates or jolts the platform 2 and rams or packs the core forming material tightly in the chambers 15 about the supporting members 65. While the jolt machine continues to operate, the chambers 15 are filled with core forming material fed to funnel 103 in any suitable manner, and passing through apertures 97 into the chambers 15. When chambers 15 have been packed tightly with the core forming material, the jolt machine is stopped and the devices 103 and 94 are removed by the operator, who may then hand ram the core material at the top of the chambers 15. The top face of the core box, the formed core, etc., are cleaned preferably by an air stream under pressure to remove any loose core forming material. The plug members 107 and wedges 44 and pins 43 are pulled and the core box is swung open on its pivots 12, 13, leaving the core forming material, designated 108, Fig. 2, adhering to the arbor members 65 and resting upon the flanges 78, thus completing the formation of the cores. The carrier member 80 is now lowered and locked, as above described, to the ends of the members 65 and the completed cores are lifted from the chambers 15 for transfer to a baking oven, or the like. This completes a cycle of operation of the apparatus, and the chambers 15 are free for the formation of another set of cores.

What I claim and desire to secure by Letters Patent of the United States is:

1. A device for forming cores of finely divided material for use in casting tubular members, comprising a base member, upward extending members supported at their lower ends on said base member, said last-named members each having an inner face contoured to form part of the longitudinal wall of a core-forming chamber, said last-named members having longitudinal meeting edges, said last-named members being movable on said base member to bring said meeting edges into engagement whereby the inner contoured faces of said last-named members cooperate to form the complete longitudinal wall of the core-forming chamber, an arbor supporting member carried by said base member and fitting within and closing the bottom end of the chamber, and means to lock said last-named members tightly together.

2. A device for forming cores of finely divided material for use in casting tubular members, comprising a base member, upward extending members supported at their lower ends on said base member, said last-named members each having an inner face contoured to form part of the longitudinal wall of a core-forming chamber, said last-named members having longitudinal meeting edges, said last-named members being movable on said base member to bring said meeting edges into engagement whereby the inner contoured faces of said last-named members cooperate to form the complete longitudinal wall of the core-forming chamber, means fitting within and closing the bottom end of the chamber and serving to support and position a core-supporting arbor member in the chamber, and means to lock said last-named members tightly together.

3. A device for forming cores of finely divided material for use in casting tubular members, comprising a base member, upward extending members supported at their lower ends on said base member, said last-named members each having an inner face contoured to form part of the longitudinal wall of a core-forming chamber, said last-named members having longitudinal meeting edges, said last-named members being movable on said base member to bring said meeting edges into engagement whereby the inner contoured faces of said last-named members cooperate to form the complete longitudinal wall of the core-forming chamber, means adjacent the top and bottom ends of the chamber to support and position a core-supporting arbor member in the chamber, and means to lock said last-named members tightly together.

4. A device for forming cores of finely divided material for use in casting tubular members, comprising a base member, upward extending members fulcrumed at their lower ends on said base member, said last-named members each having an inner face contoured to form part of the longitudinal wall of a core-forming chamber, said last-named members having longitudinal meeting edges, said last-named members being movable on said base member to bring said meeting edges into engagement whereby the inner contoured faces of said last-named members cooperate to form the complete longitudinal wall of the core-forming chamber, said base member having means to support and position a core-supporting arbor member, and means to lock said last-named members tightly together.

5. A device for forming cores of finely divided material for use in casting tubular members, comprising a base member, upward extending members each having a laterally offset and downward extending leg member pivotally supported on said base member for movement of said last-named members in substantially vertical planes, said last-named members each having an inner face contoured to form part of the longitudinal wall of a core-forming chamber, said last-named members having longitudinal meeting edges, said last-named members being movable on said base member to bring said meeting edges into engagement whereby the inner contoured faces of said last-named members cooperate to form the complete longitudinal wall of the core-forming chamber, and means to lock said last-named members tightly together.

6. A device for forming cores of finely divided material for use in casting tubular members, comprising a base member, upward extending members supported at their lower ends on said base member, said upward extending members each having a longitudinally extending recess, a filler member removably secured in each of said recesses, said filler members having longitudinal joining edges and having a face contoured to form a longitudinal portion of the wall of a core-forming chamber, said upward extending members being movable on said base member to bring said joining edges into engagement whereby the contoured faces of said filler members cooperate to form the complete longitudinal wall of the core-forming chamber.

7. A device for forming cores of finely divided material for use in casting tubular members, comprising a base member, upward extending supporting members fulcrumed at their lower ends on said base member, a core chamber-forming member secured to each of said supporting members, each of said chamber-forming members having a face thereof contoured to form a longitudinal portion of the wall of a core-forming chamber and having longitudinal joining edges, said supporting members being movable on their fulcrums to bring said joining edges into engagement whereby the contoured faces of said forming members cooperate to form the complete longitudinal wall of the core-forming chamber.

8. A device for forming cores of finely divided material, comprising a base member having a substantially horizontal surface portion, core box sections each of said sections forming a portion of the longitudinal wall of a core-forming chamber and being pivotally supported at their lower ends on said base member, said sections having longitudinal joining edges and being movable to bring said edges into lateral abutting relation to form the complete longitudinal wall of the core-forming chamber, the horizontal surface portion of said base member engaging the bottom ends of said sections to support said sections when said sections have been moved together to form the chamber, and serving to close and seal the bottom end of the chamber.

9. A device for forming cores of finely divided material, comprising a base member having a substantially horizontal surface portion, core box sections each of said sections forming a portion of the longitudinal wall of a core-forming chamber and being fulcrumed on substantially horizontal axes on said base member, said sections having longitudinal joining edges and being movable to bring said edges into lateral abutting relation to form the complete longitudinal wall of the core-forming chamber, the horizontal surface portion of said base member engaging the bottom ends of said sections to support said sections when said sections have been moved together to form the chamber, and serving to close and seal the bottom end of the chamber, said base member having means to position a core supporting arbor member within the core forming chamber.

10. A device for forming cores of finely divided material, comprising a base member having a substantially horizontal surface portion, core box sections each of said sections forming a portion of the longitudinal wall of a core-forming chamber and being pivotally supported on said base member, said sections having longitudinal joining edges and being movable to bring said edges into lateral abutting relation to form the complete longitudinal wall of the core-forming chamber, the horizontal surface portion of said base member engaging the bottom ends of said sections to support said sections when said sections have been moved together to form the chamber, and means on said base member extending into and closing the bottom end of the chamber, said last-named means serving to support and position a core supporting arbor member in the chamber.

11. A device for forming cores of finely divided material, comprising a base member having a substantially horizontal surface portion, core box sections each of said sections forming a portion of the longitudinal wall of a core-forming chamber and being pivotally supported on said base member to swing in a common substantially vertical plane, said sections having longitudinal joining edges and being movable to bring said edges into lateral abutting relation to form the complete longitudinal wall of the core-forming chamber, the horizontal surface portion of said base member engaging the bottom ends of said sections to support said sections when said sections have been moved together to form the chamber, and serving to close and seal the bottom end of the chamber, and guide means cooperable as said sections are moved into engaging relation to position said members with respect to each other.

12. A device for forming cores of finely divided material, comprising a base member having a substantially horizontal surface portion, core box sections each of said sections forming a portion of the longitudinal wall of a core-forming chamber and being pivotally supported on said base member, said sections having longitudinal joining edges and being movable to bring said edges into lateral abutting relation to form the complete longitudinal wall of the core-forming chamber, the horizontal surface portion of said base member engaging the bottom ends of said sections to support said sections as said sections are moved into abutting relation, said surface portion serving to close and seal the bottom end of the chamber, said sections having cooperable key and keyway means to position said members with respect to each other, and means to lock said sections tightly in engaging relation.

13. A device for forming cores of finely divided material, comprising a jolt machine having a superposed base member rigid therewith, and a core box mounted on said base member and having a substantially vertical core forming chamber therein, said base member closing the bottom end of said chamber and having means to position the bottom end of a core supporting arbor member in said chamber, the upper end of said box having means cooperable with the upper end of an arbor member to position the upper end of the arbor member in said chamber.

14. A device for forming cores of finely divided material, comprising a core box having a substantially vertical core forming chamber, means at the bottom end of said chamber to position a core supporting arbor member therein at its bottom end, guide means at the top end of said box, positioning means adapted to engage the top end of an arbor member in said chamber and having means cooperable with said guide means to position the top end of the arbor member in said chamber.

15. A device for forming cores of finely divided material comprising a core box having a plurality of substantially vertical core forming chambers therein, each of said chambers having means at its bottom end for positioning the bottom end of a core supporting arbor member, and a core supporting arbor member carrying means operable to support a plurality of arbor members for simultaneous positioning by said first-named means of the bottom ends of the arbor members in said chambers, said carrying means and said box having cooperable guide means to simultaneously position the top ends of the arbor members in said chambers.

16. In a device for forming cores of finely divided material, a bar member for supporting a core supporting arbor member, said bar member having locking means operable in one position to permit said bar member and an arbor member to be moved into cooperable supporting relation, said locking means being operable in another position to prevent disengagement of said bar member and an arbor member.

17. In a device for forming cores of finely divided material, a bar member for supporting a core supporting arbor member, said bar member having locking means operable in one position to permit said bar member and an arbor member to be moved into cooperable supporting relation, said locking means being operable in another position to prevent disengagement of said bar member and an arbor member, and means to maintain said locking means in either of said positions.

18. A device for forming cores of finely divided material, comprising a core box having a core forming chamber, a bar member for supporting a core supporting arbor member, said bar member having locking means operable in one position to permit said bar member and an arbor member to be moved into cooperable supporting relation, said locking means being operable in another position to prevent disengagement of said bar member and an arbor member, and cooperable guide means on said box and bar member to position said bar member operatively on said box whereby an arbor member supported by said bar member will be operatively positioned in said chamber.

19. A device for forming cores of finely divided material, comprising a core box having a substantially vertical core forming chamber, a plate member having an aperture therethrough and carried by said box, said plate member having means to position said aperture concentric with the longitudinal axis of said chamber, a core supporting arbor member in said chamber and projecting therefrom through said aperture and spaced from the edge thereof, and means carried by said plate member and positioned vertically thereabove in spaced relation, said means engaging said arbor member to center the same in said chamber whereby core forming material may be readily passed into said chamber.

20. In a device for forming cores of finely divided material, a plate member having an aperture therethrough of a diameter greater than the diameter of a core supporting arbor member whereby finely divided core forming material may pass readily through said aperture around an arbor member, post members extending upward from said plate member, and supporting means carried by said post members and overlying said plate member whereby free access to said aperture may be had, said supporting means having means cooperable with an arbor member to center the arbor member in a core forming chamber.

In testimony whereof I have hereunto subscribed my name.

MALCOLM KENNETH DOUGLAS.